July 1, 1952

J. HANDLEY 2,601,949

SELECTION AND OPERATION MECHANISM FOR
TOTALIZATOR TICKET MACHINE REGISTERS

Filed Jan. 4, 1950

11 Sheets-Sheet 1

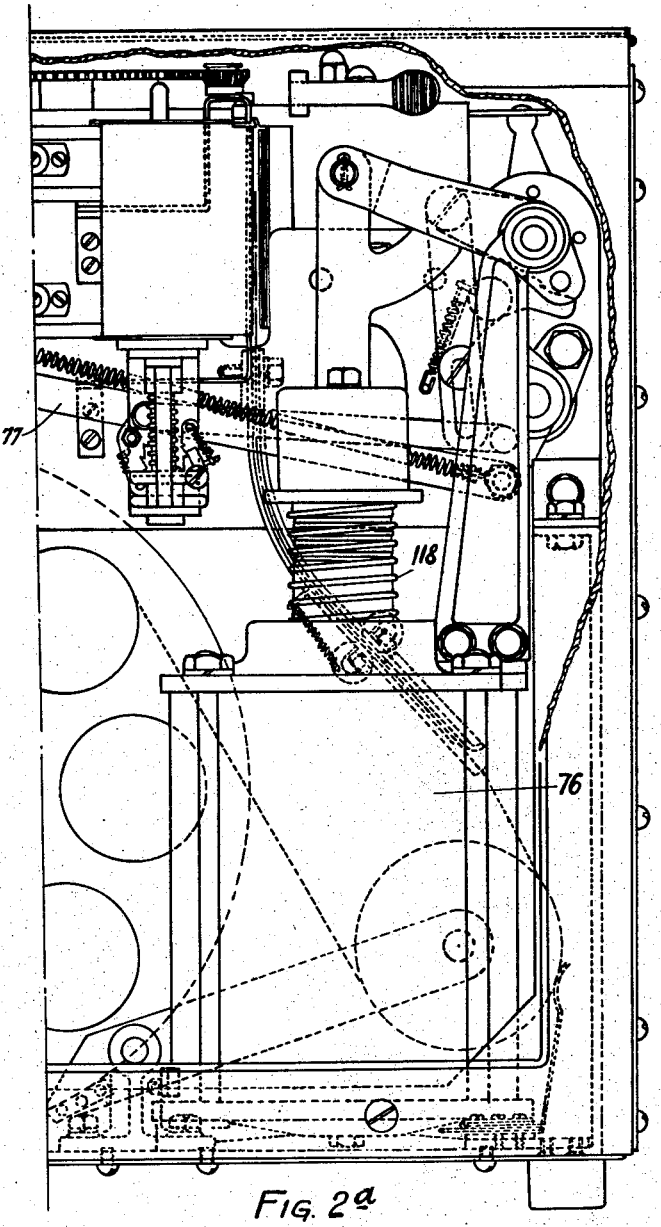

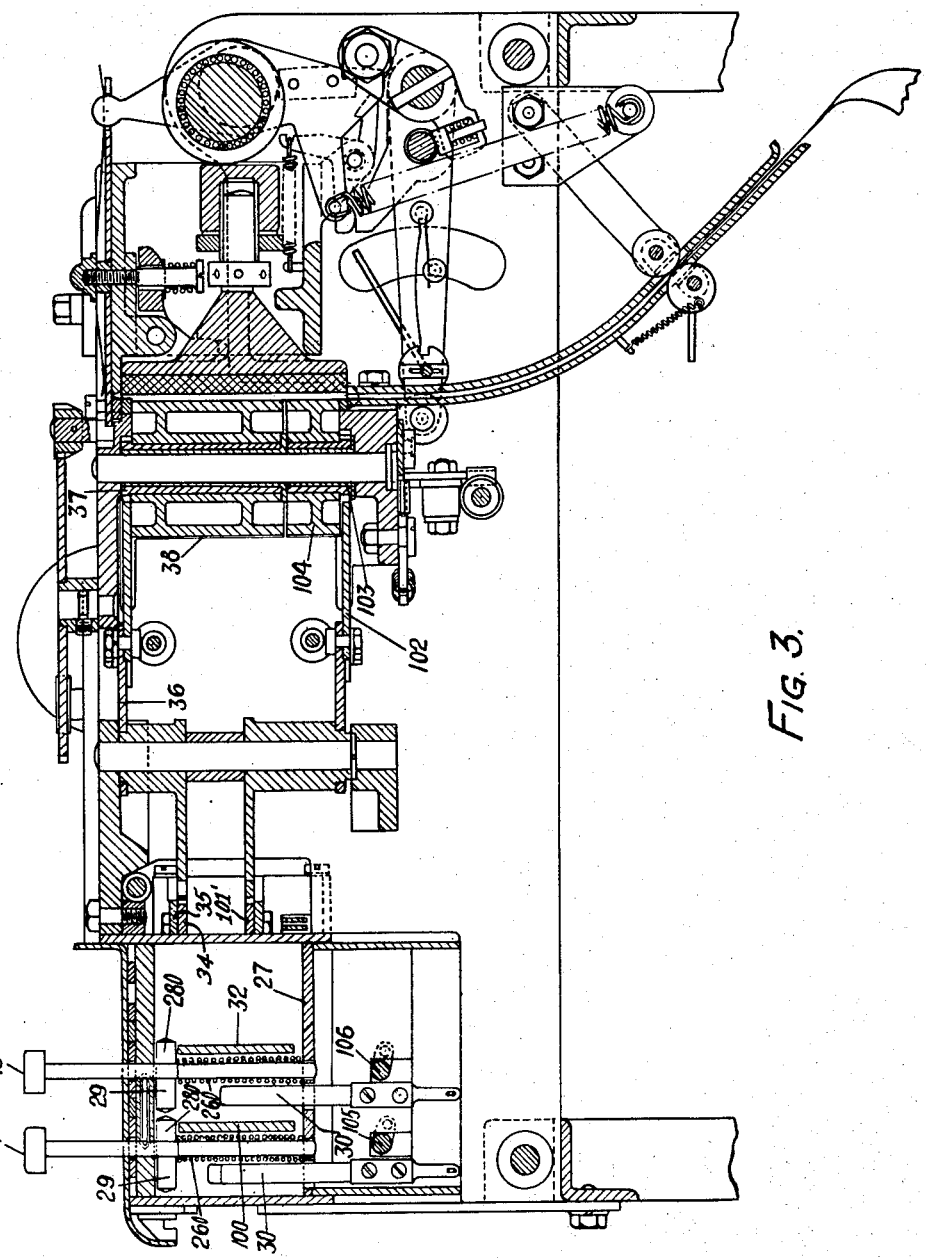

Figure 4:
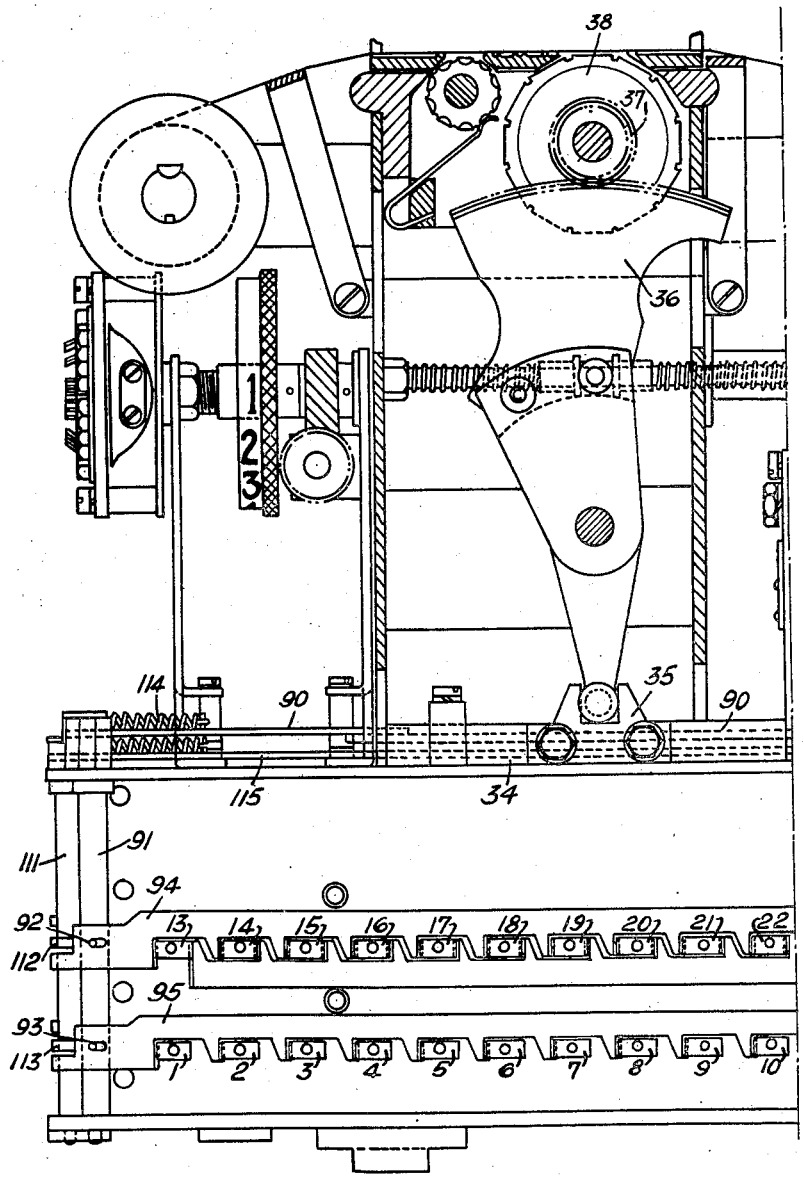

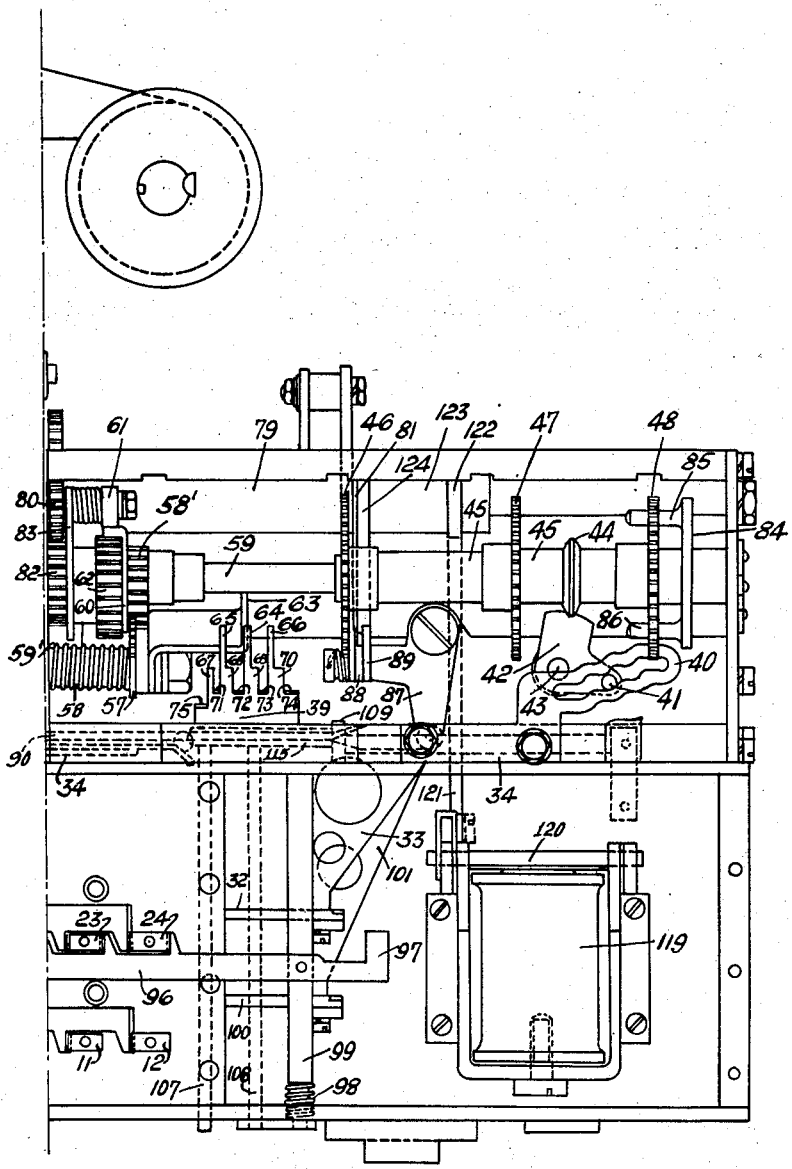
Fig. 4ª

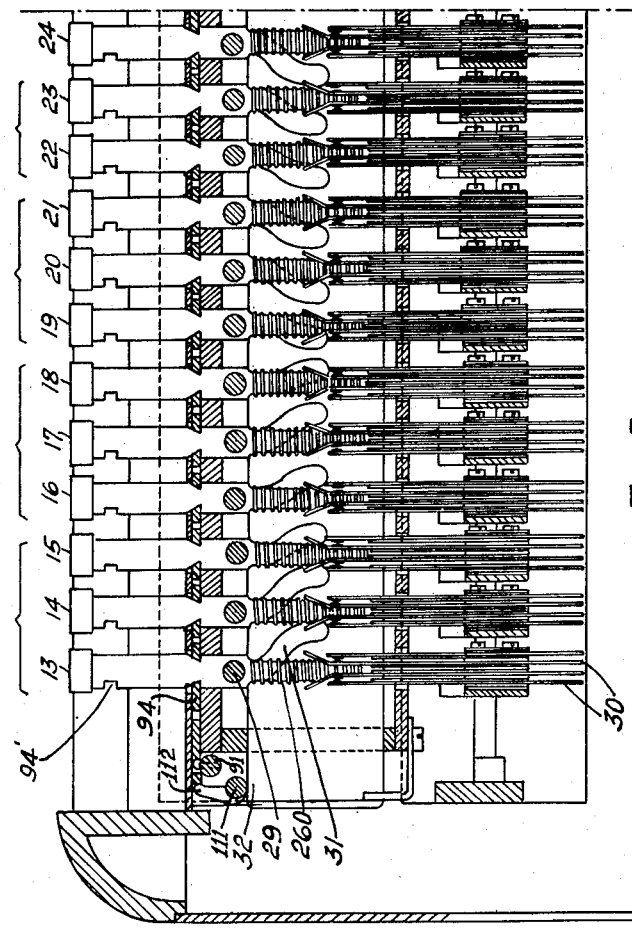

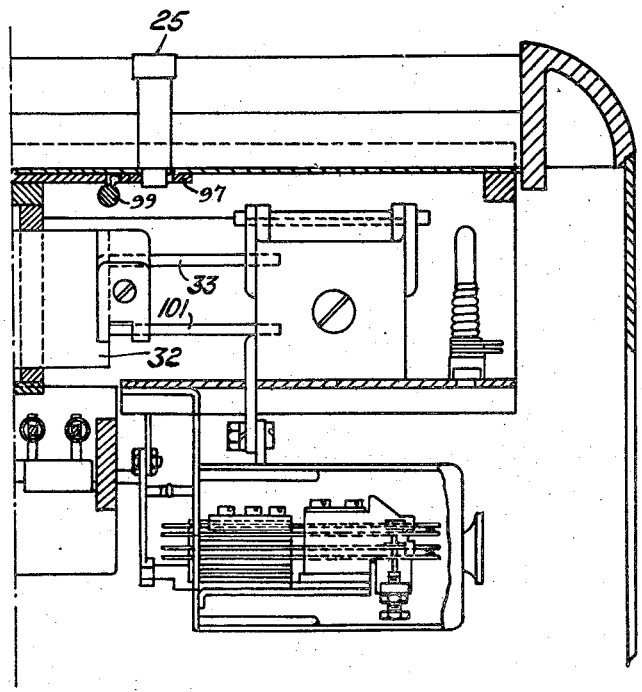
Fig. 5ª

Figure 6:
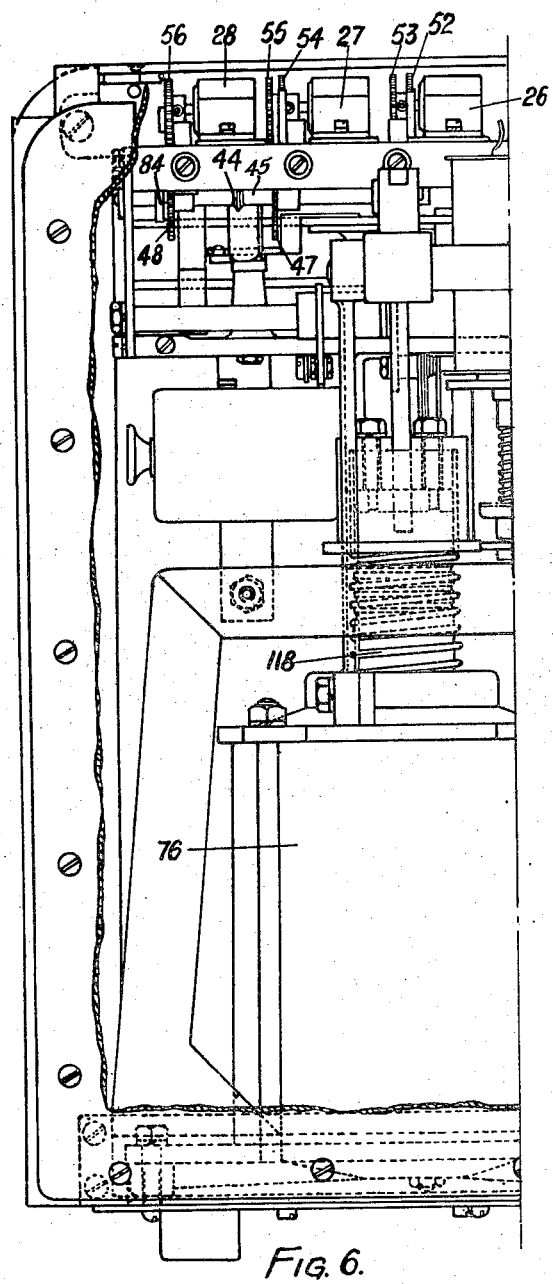

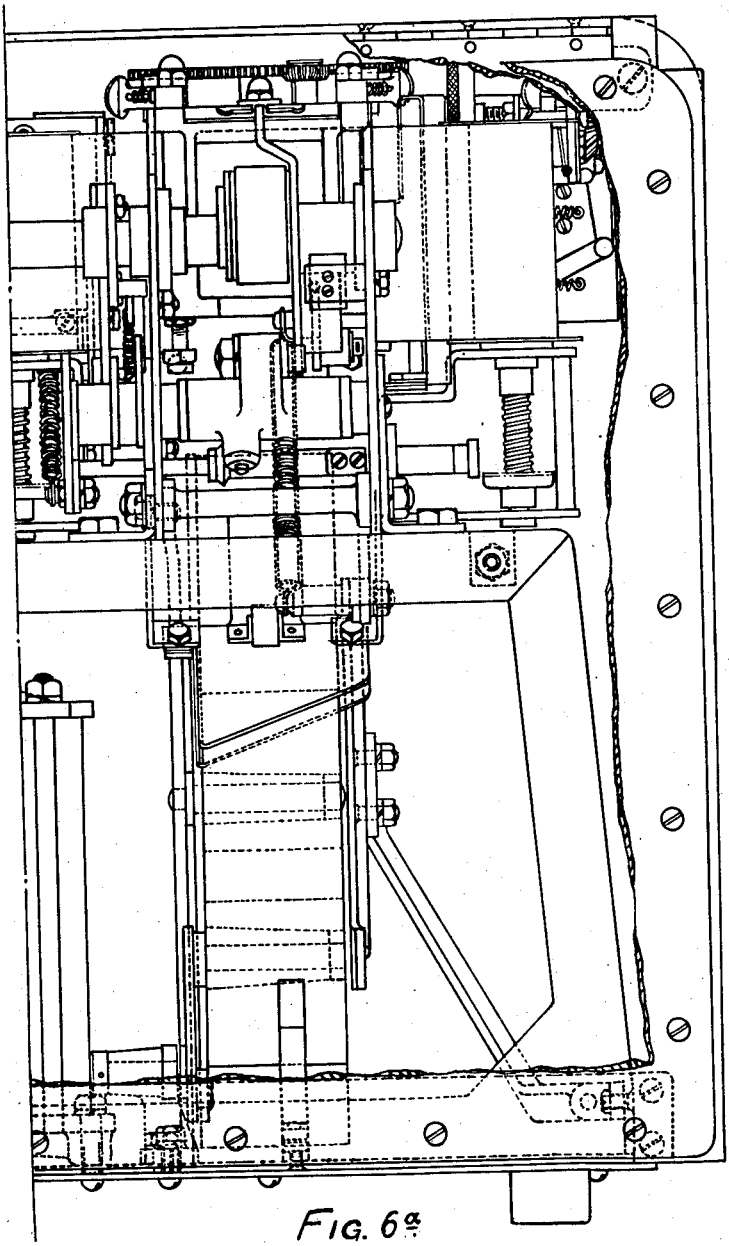
FIG. 6ª

Patented July 1, 1952

2,601,949

UNITED STATES PATENT OFFICE 2,601,949

SELECTION AND OPERATION MECHANISM FOR TOTALIZATOR TICKET MACHINE REGISTERS

John Handley, Briar Hill, Purley, England, assignor to The Union Totalisator Company, Limited, Glasgow, Scotland, a company under the laws of the United Kingdom Application January 4, 1950, Serial No. 136,694
In Great Britain September 30, 1948

3 Claims. (Cl. 235—91)

1

The invention relates to ticket printing and issuing machines for use in totalisators.

The object of the present invention is to provide a ticket printing and issuing machine having only two sets of keys, one set being for competitor selection, and the other set for selection of both stake and pool.

The main feature of the invention comprises a ticket printing and issuing machine for totalisators including keys for selecting a plurality of different classes of transactions, such as the stake and pool, a plurality of keys being provided for each class of transaction and representing different values or stakes, a registering mechanism including a counter for separately registering the values for each class of transaction, individual keys of the different classes of transactions being adapted to select the corresponding counter and operate it for registering the value represented by the individual key. The invention also includes one or more combination keys representing particular values, in the operation of which it is adapted to register such value in all of the pools or on all of the counters representing the different classes of transactions.

Figure 1:
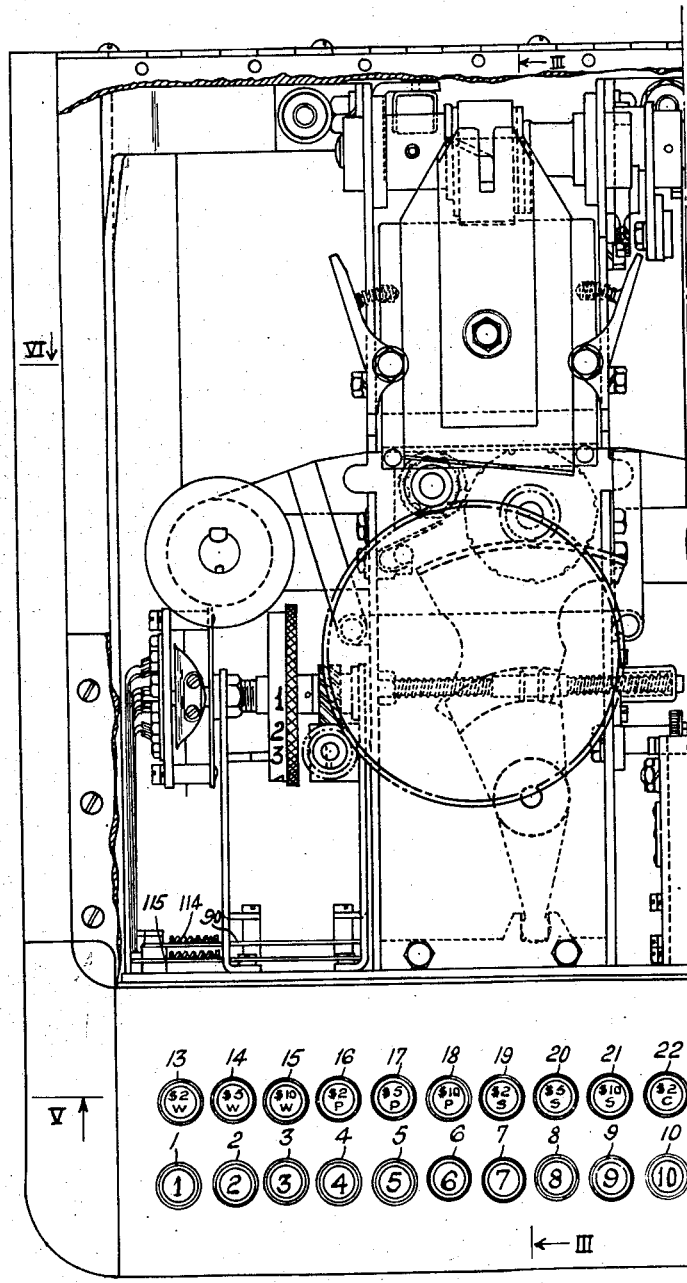
Figure 1A:
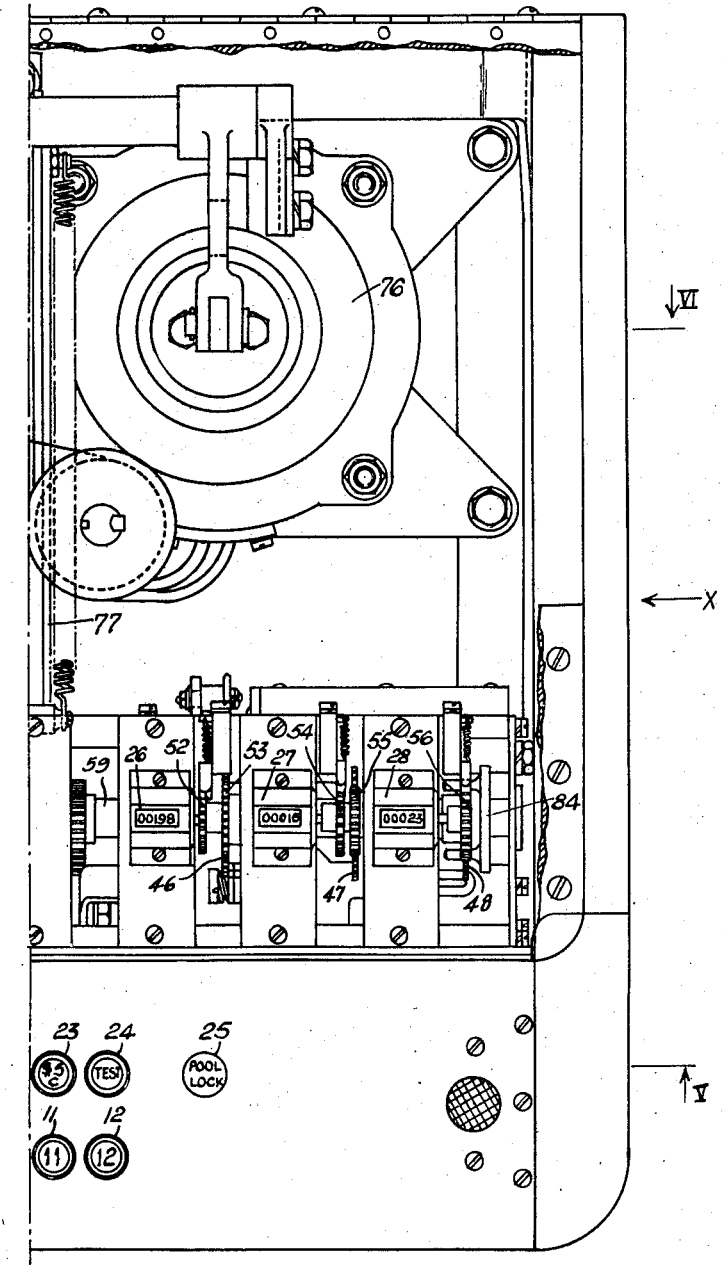

The invention will now be described with reference to the accompanying drawings in which:

Figs. 1 and 1a together constitute a view of a ticket-issuing machine according to the present invention with parts of the cover broken away.

Figure 2:
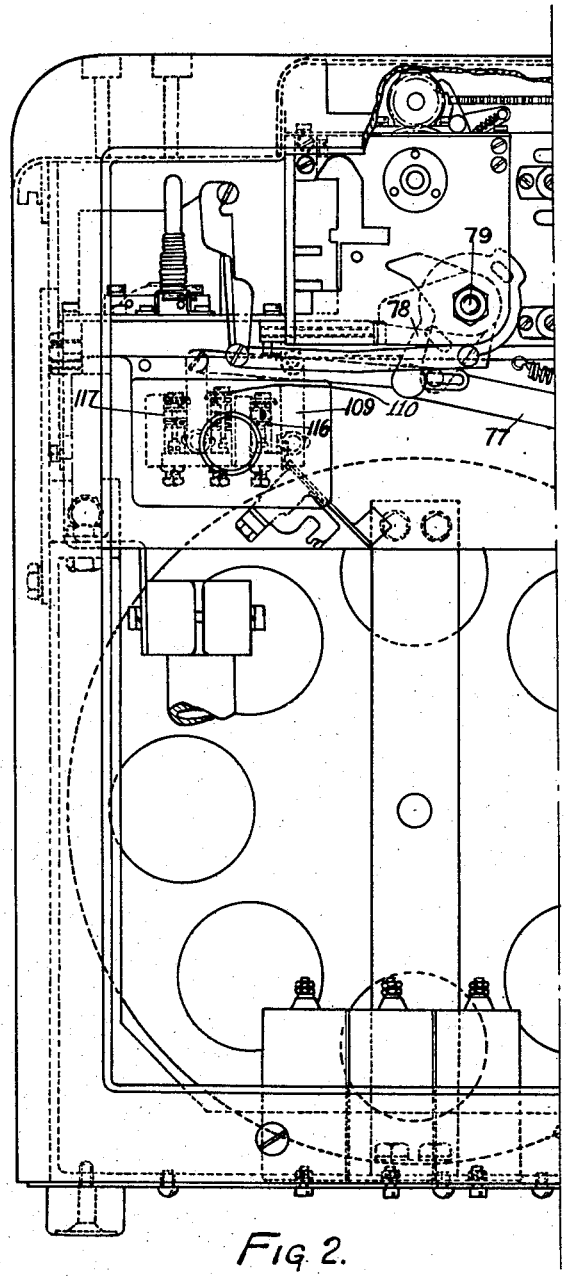

Figs. 2 and 2a together constitute a right-hand end view of Figs. 1 and 1a looking in the direction of the arrow X, certain parts of the side plates being broken away.

Fig. 3 is a section along the line III—III of Fig. 1.

Figs. 4 and 4a together constitute an enlarged view of parts of Figs. 1 and 1a with certain parts broken away.

Figs. 5 and 5a together constitute a section along the line V—V of Figs. 1 and 1a, while Figs. 6 and 6a together constitute a section along the line VI—VI of Figs. 1 and 1a.

Referring first to Figs. 1 and 1a, two rows of keys are provided 1 to 12 being for runners 1 to 12, keys 13 to 23 being pool and stake keys, each of keys 13 to 23 being adapted to select both pool and stake; the key 24 is a test key, and the key 25 is a pool lock key, the purpose of which will be described later. Three counters 26, 27 and 28, respectively Win, Place (i. e., second place) and Show (i. e., third place) are operated in response to the issuing of a ticket, and record the number of units of the bet. The two keys 22

2 and 23 marked $2C and $5C are for combined bets in which $2 and $5 respectively are bet in each of the three pools. In this case $2 or $5 as the case may be are separately recorded on all three counters. The general operation of the remainder of the equipment shown is in general similar to that shown in the prior United States patent applications Nos. 673,353 and 3,798, the latter of which has issued as Patent No. 2,527,996.

Referring now to Figs. 3, 4 and 4a, and 5 and 5a, operation of a stake and pool key will now be described. Each key has on the lower portion of its shank a spring 260 bearing on a plate 270. Immediately above this spring is a metal roller 280 on one side of the shank and an insulating roller 29 on the other side thereof. The insulating roller 29 when the key is depressed closes pairs of contacts 30 to perform certain electrical functions of the apparatus such as transmission of the bets to a central station. The metal roller 280 when its key is depressed is forced into a cam slot 31 in a central plate 32, which is moved to the right or left a distance corresponding to the curvature of the slot. Attached to the end of the plate 32 is a finger-member 33 connected at its other extremity to a stake-and-pool slide bar 34. Also attached to the stake-and-pool slide bar 34 is a member 35 adapted to position a sector 36. The sector 36 drives a pinion 37 to position a type wheel 38 having 12 faces since 11 stake-and-pool keys and one test key are provided.

When the stake-and-pool slide bar 34 is moved to actuate the type wheel 38 it also moves longitudinally a stake cam 39 (Fig. 4a), which will be more fully described hereinafter, and a slotted plate 40. By a pin 41 travelling in the stepped slot of the plate 40, motion of the slide bar 34 and the plate 40 actuates a crank member 42 pivotally mounted at 43. The opposite arm of the crank 42 has a notch which engages a wheel 44 mounted on a sleeve 45 carrying gear wheels 46, 47 and 48. These wheels when suitably positioned are adapted to engage corresponding gears on the three counters 26, 27 and 28 (Fig. 1a).

The win counter 26 (Fig. 1a) has two gears 52, 53, the place counter 27 has two gears 54, 55 while the show counter 28 has one gear 56, which gears are driven from wheels 46, 47 and 48 as will be hereinafter described. Positioning of these gears will now be described with four examples.

1. Operation of any one of keys 13, 14 and 15 for an entry in the "win" pool causes control plate 32 to move to the left. Through the finger 33 the slide bar 34 is also moved to the left, and as has been described, positions the type wheel 38 for printing. The pin 41 will be in the rearmost track of the slotted plate 40 and will so position the sleeve 45 carrying the gears 46–48 that the gear wheel 46 engages the gear 52 on the counter 26 so that bets are recorded by the win counter.

2. Operation of any of the keys 16–18 causes similar but smaller movements to the left of the slide bar 34 to those described in (1), the pin 41 being now in the second slot of the plate 40. This causes the gear sleeve 45 to be so placed that the wheel 47 engages the wheel 54 to record bets in the place counter 27.

3. Operation of one of the keys 19–21 moves the control plate 32 and hence the slide bar 34 to the right, so that the pin 41 is in the third slot in the slotted plate 40. The sleeve carrying the gears is then positioned so that the wheel 48 engages the wheel 56 to record bets on the show counter 28. Positioning of the type wheel occurs in a similar manner to that already described.

4. Operation of the keys 22 or 23 moves the plate 32 still further to the right, causing the pin 41 to enter the front track of the plate 40 and move the sleeve so that all three gears 46–48 are positioned as in Fig. 1ª and cause recording of bets. Thus the gear 46 engages the gear 53 to record on the win counter 26, the gear 47 engages the gear 55 to record on the place counter 27 and the gear 48 engages the gear 56 to record on the show counter 28. Thus when a key corresponding to a combined bet is operated, the bet will be recorded on all three counters. It will be seen that the gear 56 is wider than the other gears. This is so that it will be engaged by the gear 48 in either of two positions of the sleeve, those corresponding to show and combined bets. Again, type wheel positioning follows the sequence already described.

The key 24 is the test key and neither operates any contacts nor has any effect on the counters. Its sole purpose is to check the operation of the machine. When it is operated the type wheel 38 is so positioned as to print "Test" on the ticket.

When one of the stake keys 13–23 is depressed a toothed sector 57 (Fig. 4ª) mounted on a shaft 58 and biased by a spring 59' rotates to drive the gear 58' freely mounted on the shaft 59 on which the sleeve 45 carrying the gears 46–48 is mounted. As the gear 58' rotates, it carries with it an arcuate shroud 60 disposed between a pawl 61 and a ratchet wheel 62 for a purpose to be described later. Also carried round with the sector 57 is a finger member 63. The sector 57 and finger 63 rotate until the finger 63 engages one of the stake-cam faces. The shroud 60 is then correctly positioned, exposing a suitable number of the teeth of the ratchet wheel 62. It will be seen that the normal position of the finger 63 is in contact with a cam face 64, one of the highest faces of the cam. This position is blank, so while 63 rests on 64 no bet can be recorded. Faces 65 and 66 which correspond to $10 bets are of the same height as 64, so the normal positioning of the shroud 60 is that corresponding to a $10 bet. The other faces correspond to the other bet values, faces 67–70 to $5 bets, the faces 71–74 to $2 bets and the face 75 to "test" for which no recording occurs.

Thus, operation of a stake-and-pool key causes, by the movement of the gear-carrying sleeve, connection of the gears to whichever pool is selected, and positions the shroud 60 in accordance with the value of the bet. The key contacts, as has been stated, cause control of the central apparatus, after which an impulse is transmitted to the ticket issuing machine to operate a solenoid 76 (Figs. 2ª and 6), which controls the printing mechanism. The printing is the same as that disclosed in my prior patent applications Nos. 673,353 and 3,798 and so will not be described in detail. When the solenoid plunger operates to print a ticket, via links 77 and 78 (Fig. 2), it rotates a main drive shaft 79 (Figs. 2 and 4ª). The main drive shaft 79 carries a toothed sector 80 and a lever 81, whose purpose will be hereinafter described.

The toothed sector 80 engages a pinion 82 freely mounted on the shaft 59 and carrying an arm 83 on which is mounted the pawl 61. Rotation of the shroud 60 is into the paper at the pawl side so as to expose to the pawl a number of teeth which is inversely proportional to the travel of the finger 63. The pawl 61 normally rests on the shroud 60, and when the solenoid operates, it is rotated along the surface of the shroud and in the same direction by the sector 80 etc., as described. At the end of the shroud 60 it engages the ratchet wheel 62 and thence drives the shaft 59. Mounted on the other end of the shaft 59 is a disc 84 bearing spigots 85 and 86. These spigots fit in holes in the end gear 48, and convey the drive from the shaft 59 to the sleeve carrying the gears 46–48. Therefore, when the pawl 61 engages the ratchet wheel 62, the gears 46–48 are rotated and whichever of these is in engagement with the counter gears as previously described, causes recording of a bet. It is apparent that by the travel of the solenoid plunger, and hence via the linkage already described, the radial motion of the pawl 61 is fixed. Therefore, the further shroud 60 has been moved, the less of the travel of the pawl 61 is effective to drive the shaft 59. If $10 bets are to be recorded, the shroud 60 is in its "state of rest" position and, at the other extreme, if the test key has been depressed the shroud will have been so placed that at no point in its travel does the pawl 61 engage the wheel 62.

Resetting is carried out by the return stroke of the solenoid which, through the linkage already described, rotates the main drive shaft 79 in the opposite direction to its previous motion. This rotates the sector 80 to its rest position, and also carries the lever 81 to its rest position to operate the resetting rocker 87. Mounted on this rocker are two spring-biased pawls 88 and 89. When the lever 81 is moved by the shaft 79 on the "operate" stroke of the solenoid 76 its nose depresses the pawl 88 against the spring and passes on without moving the rocker 87. On the return stroke, however, the lever 81 hits the pawl 88, which cannot now give way, and therefore, the rocker 87 pivots to move the resetting slide link 90 longitudinally. The link 90 rocks a release shaft 91 (Fig. 4) carrying pins 92 and 93 and engaging holes in locking bars 94 and 95, which are therefore withdrawn so that the operated keys restore under control of their springs 260. It should be noted that, as in my above quoted patent applications Nos. 673,353 and 3,798, each key has a notch such as 94' (Fig. 5) which engages a corresponding portion of the locking bar when the key is depressed. The locking bar is spring biased to the right (in Fig. 5). Thus it is impossible for more than one key in any row to be operated.

In addition to lock bars 94 and 95 a further lock bar 96 is provided, which has an extension 97 by means of which it can be used or not as desired by setting the pool lock key 25 to either of two positions. This bar is, when in use, held against the stake-and-pool keys by a spring 98 through a shaft 99. The purpose of this is to lock out a particular pool or pools on the machine. Thus, if it is desired to use the particular machine to sell place, show and combined bet tickets, and not win tickets, all the win keys 13-15 are depressed and the pool key 25 turned through 90°. This can be used to lock out any one, or more than one, of the pools. This is therefore independent of the action of the rest of the machine.

The competitor keys (keys 1-12) act on a control plate 100 (Fig. 3) similar to plate 32, control key contacts 30, and through a finger 101 (Fig. 4ª) control a slide ar 101' to position sector 102 (Fig. 3), which, through a pinion 103, sets a type wheel 104 for printing. Resetting of this sector and type wheel occurs when the keys 1-12 are released by the withdrawal of locking bar 95 (Fig. 4).

Two engagement bars 105 and 106 (Fig. 3) are provided which are each engaged by one key in the corresponding row when said keys are depressed. These, through bell cranks (not shown), withdraw the release bars 107 and 108 (Fig. 4ª). When these are fully withdrawn, i. e., the machine is properly set up, a contact lever 109 (Fig. 2) is permitted to close the key contacts 110 if the locking bars are fully engaging the keys, i. e., if the keys are properly set. Further to these provisions, there is provided a check shaft 111 having fingers 112 and 113 bearing on locking bars 94 and 95 respectively. The check shaft 111 is spring biased by a spring 114, and when two keys (one in each row) are properly operated the movement of the locking bars 94 and 95 causes the check shaft 111 to rotate, driven by the spring 114, keeping its fingers 112 and 113 in contact with the locking bars 94 and 95. If the keys are not properly operated, the check shaft 111 will not rotate and through a thrust check link 115 prevents movement of the contact lever 109, since normally the end of the thrust check link (not shown) prevents any movement of the lever 109.

When closed, the key contacts 110 transmit a signal to the control apparatus of the totalisator to collect the bet. The solenoid 76 is then operated to print and issue the ticket as described in my prior patent applications Nos. 673,353 and 3,798. In addition to operating the counters, as already described, the solenoid, in operating, opens contacts 116 (Fig. 2), which prevent duplicate response to any one bet at the beginning of its stroke. At the end of its stroke the solenoid 76 causes contacts 117 to open, thereby releasing the relay (not shown) which controls the solenoid, so that the solenoid is de-energised and its plunger returned to normal by a spring 118.

When any competitor key corresponds to a non-runner, circuits are set up in the control apparatus in accordance therewith. If such a key be operated, a cancel magnet 119 (Fig. 4ª) operates from the control apparatus. When the armature 120 of the cancel magnet 119 closes, it rocks by a link 121 (shown dotted under the gear assembly), a crank 122 mounted on a sleeve 123 on the shaft 79. Also mounted on this sleeve 123 is an arm 124 which co-operates with the pawl 89 on the rocker 87 in the same manner as the lever 81 and the pawl 88 co-operate. This restores the apparatus to normal in a similar manner to that already described for normal restoration.

What is claimed is:

1. In a ticket printing and issuing machine for totalisators, the combination of a counter for each pool in which bets can be entered, a first set of keys each representing an individual competitor, a second set of keys each representing both the stake value of a bet and the pool in which said bet is to be entered, said second set of keys including at least one key representing a combined bet to be entered in all of said pools, a first control plate operatively associated with all keys of said first set and adapted to be moved when any one of said keys is operated, the amount and direction of said movement representing the identity of an operated key of said first set, a second control plate operatively associated with all keys of said second set and adapted to be moved when any one of said keys is operated, the amount and direction of said movement representing the identity of an operated key of said second set, a third control plate carried by said second slide bar and having a stepped slot, said slot having a track-like step corresponding to each said pool and a further track-like step corresponding to a combined bet to be entered in all of said pools, and means controlled by the appropriate one of said steps for operating the counter for the pool in which a bet is to be entered, said further step being arranged to cause simultaneous operation of all of said counters in response to operation of a key of said second set for a combined bet.

2. In a ticket printing and issuing machine for totalisators the combination of a first set of keys each representing a single competitor, a second set of keys each representing both the stake value of a bet and the pool in which said bet is to be entered, there being three pools respectively win, place, i. e., second place, and show, i. e., third place, the keys of said second set including at least one key representing a combined bet to be entered in the win, place and show pools, a register mechanism including a counter for separately registering the values of bets entered in said three pools, a first control plate operatively associated with all keys of said first set and adapted to be moved when any one of said keys is operated, the amount and direction of said movement representing the identity of the operated key of said first set, a second control plate operatively associated with all keys of said second set and adapted to be moved when any one of said keys of said second set is operated, the amount and direction of said movement representing the identity of the operated key of said second set, a third control plate carried by and moved with said second slide bar and having a stepped slot formed therein, said slot having a plurality of steps each corresponding to one of said pools and a further step corresponding to a combined bet, and a device in operative association with said stepped slot and adapted to operate the appropriate counter when said second slide bar is caused to move in response to operation of a key of said second set, the arrangement being such that when said device cooperates with said further step it causes simultaneous operation of all of said counters.

3. In a ticket printing and issuing machine for totalisators, the combination claimed in claim 2 and comprising a source of power, a shaft driven by said source of power, a plurality of gear wheels on said shaft, first and second gear wheels forming part of each of two of said counters, a single gear wheel forming part of said third counter and having a width in excess of that of said other gear wheels, and means controlled by said second slide bar and said third control plate for meshing a gear wheel on said shaft with whichever of the first gear wheel of said first counter, the first gear wheel of said second counter and the single wide gear wheel of said third counter is appropriate to the bet being entered in the case of a single pool bet, said last named means meshing gear wheels on said shaft with the second gear wheels of each of said first and second counters and the wide gear wheel of said third counter.

JOHN HANDLEY.

REFERENCES CITED

The following references are of record in the file of this patent:

UNITED STATES PATENTS

| Number | Name | Date |
|---|---|---|
| 1,983,247 | Saxby | Dec. 4, 1934 |
| 2,226,960 | Anderson | Dec. 31, 1940 |
| 2,378,708 | Keen et al. | June 19, 1945 |

FOREIGN PATENTS

| Number | Country | Date |
|---|---|---|
| 591,260 | Great Britain | Aug. 12, 1947 |
| 610,333 | Great Britain | Oct. 14, 1948 |